(12) United States Patent
Green et al.

(10) Patent No.: US 9,316,332 B2
(45) Date of Patent: Apr. 19, 2016

(54) MARINE PIPELINE-INSTALLATION TOWER AND TENSIONING ASSEMBLY

(75) Inventors: Andy Green, Inverurie (GB); Cédric Mouchel, Elrick (GB)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 14/127,095

(22) PCT Filed: Jun. 25, 2012

(86) PCT No.: PCT/GB2012/051478
§ 371 (c)(1),
(2), (4) Date: Jan. 31, 2014

(87) PCT Pub. No.: WO2013/005005
PCT Pub. Date: Jan. 10, 2013

(65) Prior Publication Data
US 2014/0169885 A1    Jun. 19, 2014

(30) Foreign Application Priority Data

Jul. 1, 2011 (GB) .................................. 1111223.2

(51) Int. Cl.
*F16L 1/23* (2006.01)
*F16L 1/12* (2006.01)
(Continued)

(52) U.S. Cl.
CPC . *F16L 1/12* (2013.01); *B63B 35/03* (2013.01); *F16L 1/19* (2013.01); *F16L 1/203* (2013.01); *F16L 1/207* (2013.01); *F16L 1/23* (2013.01)

(58) Field of Classification Search
CPC ............ B63B 35/03; F16L 1/19; F16L 1/207; F16L 1/23; F16L 1/225; F16L 1/12; F16L 1/235; F16L 1/203

USPC ........ 405/158, 165, 166, 168.1, 168.2, 168.4, 405/184.4
See application file for complete search history.

(56) References Cited

U.S. PATENT DOCUMENTS 6,273,643 B1    8/2001  Baugh
6,352,388 B1 *  3/2002  Seguin ......................... 405/166
(Continued)

FOREIGN PATENT DOCUMENTS

EP    0 296 272 A1    12/1988
EP    0947416          10/1999
(Continued)

OTHER PUBLICATIONS

International Search Report dated Aug. 10, 2012 issued in corresponding International patent application No. PCT/GB2012/051478.
(Continued)

*Primary Examiner* — Benjamin Fiorello
*Assistant Examiner* — Carib Oquendo
(74) *Attorney, Agent, or Firm* — Ostrolenk Faber LLP

(57) ABSTRACT

A marine pipeline-installation tower comprising at least two opposing legs, and one or more tensioning assemblies supported by the opposing legs for surrounding and supporting an intermediate pipeline during installation, at least one of the intermediate tensioning assemblies comprising two or more discrete segments, the segments being moveable between: a closed position wherein the segments are conjoined to form an enclosing pipeline annulus able to support the pipeline between the legs of the tower; and an open position wherein at least two of the segments are disconnected and separate. In this way, a better clearance is achievable between the parts of the segments able to form the enclosing pipeline annulus when the segments are in their open position, because the segments are able to be disconnected and separate despite still being supported within the limited room between the fixed legs of the tower.

17 Claims, 5 Drawing Sheets

(51) Int. Cl.
*F16L 1/20* (2006.01)
*F16L 1/19* (2006.01)
*B63B 35/03* (2006.01)

(56) References Cited

U.S. PATENT DOCUMENTS

| | | | |
|---|---|---|---|
| 6,450,385 | B1 | 9/2002 | Guerin |
| 8,104,995 | B2 * | 1/2012 | Roodenburg et al. ...... 405/168.4 |
| 2003/0147699 | A1 | 8/2003 | Long et al. |
| 2006/0188341 | A1 | 8/2006 | Stockstill |
| 2006/0275102 | A1 | 12/2006 | Willis |

FOREIGN PATENT DOCUMENTS

| | | |
|---|---|---|
| FR | 2 776 721 | 11/1999 |
| FR | 2 778 721 | 11/1999 |
| GB | 2 336 191 | 10/1999 |
| GB | 2 364 758 | 2/2002 |
| GB | 2 462 656 | 2/2010 |
| WO | WO 98/50719 | 11/1998 |
| WO | WO 03/067019 A2 | 8/2003 |
| WO | WO2006/054891 | 5/2006 |
| WO | WO2006/085739 | 8/2006 |
| WO | WO 2007/108673 A1 | 9/2007 |
| WO | WO 2008/007945 A1 | 1/2008 |
| WO | WO 2009/088287 A2 | 7/2009 |

OTHER PUBLICATIONS

International Preliminary Report dated Jan. 7, 2014 issued in corresponding International patent application No. PCT/GB2012/051478.
Search Report dated Oct. 19, 2011 issued in corresponding United Kingdom Patent No. 2492402B.
European Third Party Observation, dated Feb. 21, 2014, issued in corresponding European Patent Application No. EP12730254.5-1758. Total 4 pages.

* cited by examiner

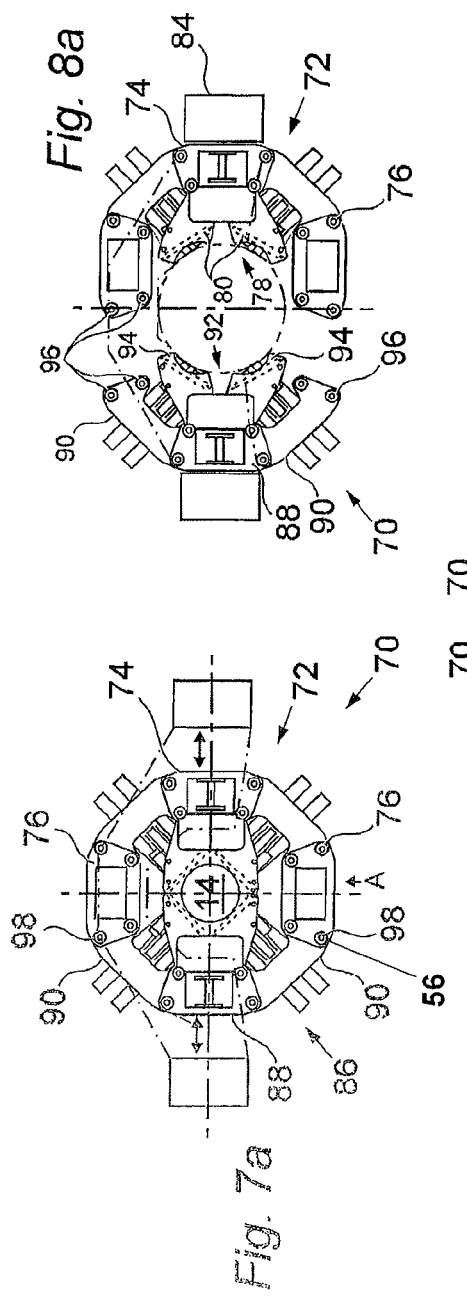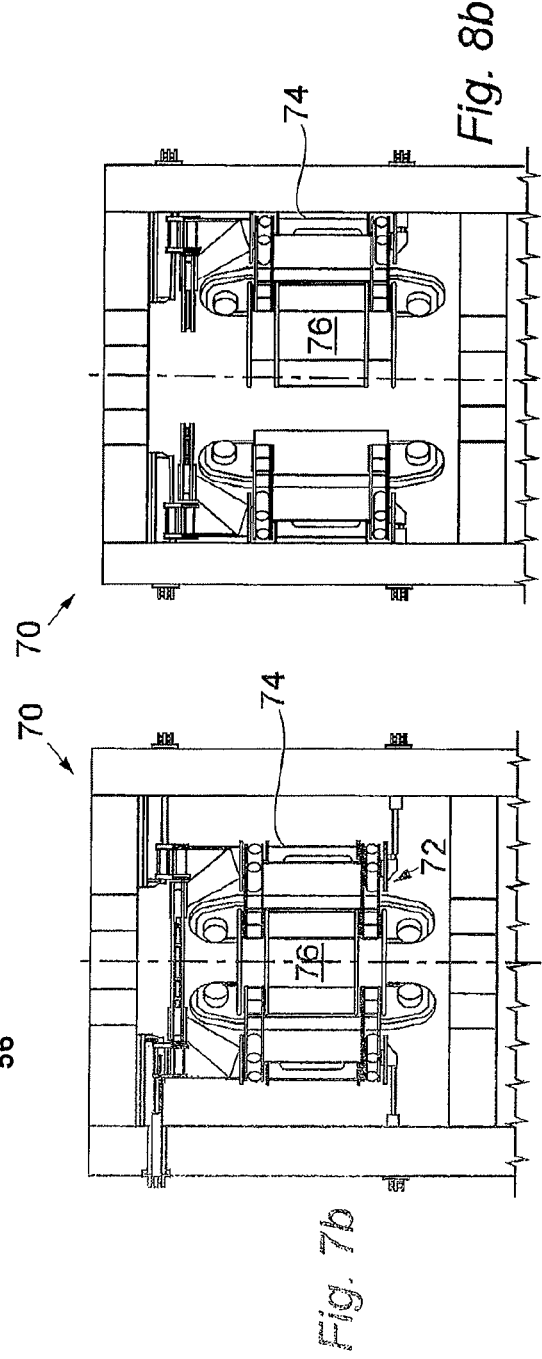

MARINE PIPELINE-INSTALLATION TOWER AND TENSIONING ASSEMBLY

CROSS REFERENCE TO RELATED APPLICATIONS

The present application is a 35 U.S.C. §371 National Phase conversion of PCT/GB2012/051478, filed 25 Jun. 2012, claiming the benefit of United Kingdom Application no. 1111223.2, filed Jul. 1, 2011, the disclosure of which is incorporated herein by reference. The PCT International Application was published in the English language.

TECHNICAL FIELD OF THE INVENTION

The present invention relates to a marine pipeline-installation tower and tensioning assembly for surrounding and supporting a pipeline during installation, a method of providing a clearance circle in a tensioning assembly, and a pipeline-installation vessel comprising such a tower and/or tensioning assembly.

BACKGROUND OF THE INVENTION

Marine pipelines for conveying hydrocarbons, generally being gas and/or crude oil, are typically laid from specialised pipe-laying vessels or barges. Marine pipelines include rigid pipes and flexible pipes, as defined in the standards published by the American petroleum institute (API) API 17J and API RP 17B. The rigid pipelines are deployed and lowered into the sea and down to the seabed in a controlled fashion, with the pipelines either being assembled from individual pipe sections on the vessel (referred to as "stovepiping"), or whilst spooled from one or more reels on the vessel (referred to as "reel pipelaying"). The flexible pipelines are deployed and lowered into the sea and down to the seabed whilst stored from a basket.

Part of the deployment of the pipeline from the vessel can involve passing the pipeline through one or more 'launch means' or 'deployment means'. This can include apparatus or assemblies for straightening the pipeline as it leaves a reel, and to ensure that the pipeline is properly guided during launch, generally along a correct 'launch trajectory' or 'laying path', for delivering the pipeline from the vessel into the sea and down to the seabed.

Commonly, the pipelaying vessel includes a tower, (which may also be moveable, and particularly rotatable to an angle to the vertical). One common tower is a kind of derrick, with two fixed legs embedded in or anchored to the deck of the vessel. The tower is generally for supporting one or more tensioning devices arranged inside the frame of the derrick and able to tension the pipeline during the pipe-lay operation so as to support the weight of the pipeline in the water prior to reaching the seabed. This configuration helps to reinforce the stiffness of the tensioning arrangement. Some tensioning devices include 'tracks', often in the form of caterpillar tracks, able to allow or induce movement of the pipeline through the tensioning device whilst still applying sufficient tension thereto.

Referring now to the rigid pipelay system, it also can be desired to 'hold' a pipeline during a pipe-laying operation, generally using a 'hang-off clamp', to allow the attachment of accessories to the rigid pipeline, such as at one end, or to one or more intermediate locations along the pipeline. Such accessories can be relatively large and heavy, and are commonly designed to be welded to or into the pipeline. Examples of such accessories are initiation fittings, pipeline end terminations (PLETs), pipe valves, and tee assemblies.

To allow access to the rigid pipeline to attach such accessories, one idea is to move the pipeline away from its launch trajectory or laying path. For example, WO03067019A shows the movement of a hang-off clamp and a launch pipeline together along a rail for connection to a 'heavy device'. Once the heavy device is connected to the pipeline, the assembly is returned to the launch position next to the tower.

Another idea is to maintain the position of the pipeline in its launch trajectory, generally supported by a hang-off clamp, and move the tensioning assemblies out of the launch trajectory or firing line. EP2005050B shows a tower able to move a tensioner frame between an active position and a retracted and non-operable position spaced from the pipeline launch trajectory.

WO2008/007945A shows a tensioner frame which is openable by having two pivotal frame parts to allow the introduction/removal of a pipeline, whilst requiring a parallel linkage bar system to allow each of its multiple track units to be mobile with a frame.

Referring now to the flexible pipe laying system, it also can be desired to pass flexible end fittings down through the firing line from above all the tensioning devices in the stack.

In both systems, space is limited within the tower or derrick, whose legs are generally only a few meters apart, such as 10 m. However, as exploration and production goes to greater depths, such that longer pipelines and stronger pipelines are required, there is a need to deploy heavier and larger subsea accessories and flexible end fittings for and in such pipelines. The practice of any conventional openable tensioning frame in a tower/derrick frame known to date provides a maximum clearance from a closed position of 1.8 m to an open position of 2.8 m only, i.e. only 1 extra meter within the leg structure, which thereby limits some of the now desired accessory installation.

SUMMARY OF THE INVENTION

One aim of the present invention is to provide an openable tensioning device that provides a larger clearance for a tensioning device included in the tower frame.

According to one aspect of the present invention, there is provided a marine pipeline-installation tower comprising at least two opposing legs, and one or more tensioning assemblies supported by the opposing legs for surrounding and supporting an intermediate pipeline during installation, at least one of the tensioning assemblies comprising two or more discrete segments, being a first segment and at least a second segment, the segments being moveable between:
  a closed position wherein the segments are conjoined to form an enclosing pipeline annulus able to support the pipeline between the legs of the tower; and
  an open position wherein at least two of the segments are disconnected and separate.

In this way, a better clearance is achievable between the parts of the segments able to form the enclosing pipeline annulus when the segments are in their open position, because the segments are able to be disconnected and separate despite still being supported within the limited room between the fixed legs of the tower.

Tensioning assemblies useable for marine pipeline-installation are well known in the art, and include tensioning devices discussed hereinbefore. They may be directly or indirectly supported by the legs of the tower, and may comprise a number, such as 2, 3 or 4, along a pipe-laying trajectory or a launch trajectory or a firing line, etc. through the tower, so as to provide multiple support assistance during the pipe-laying operation to the pipeline. Typically, a tower of a pipe-laying vessel comprises 2-4 tensioning assemblies extending laterally therefrom to provide a launch trajectory that then extends either through the vessel, such as through a moonpool, or over a side or an end of the vessel.

Optionally, all the tensioning assemblies in the marine pipeline-installation tower of the present invention are tensioning assemblies comprising two or more discrete segments as defined herein.

The or each tensioning assembly in the present invention comprises two or more discrete segments. When such segments are conjoined in their closed position, they are able to provide an enclosing pipeline annulus able to provide total enclosure around a pipeline.

The segments are discrete by being completely separate to each other, other than through their attachment to the tower. Optionally, each segment is independently moveable or otherwise operable, although the movement of the segments is preferably complementary and/or coordinated between the open and closed positions.

In the closed position, the segments are conjoined to form an enclosing pipeline annulus able to support the pipeline. The segments can be conjoined at two or more separate locations. Preferably, the segments are securely joined in their closed position.

The conjoining of the segments may include the connection, linking or other joining, of one or more parts of each segment with one or more parts of each other segment. Optionally, one or more parts of each segment may be secured to one or more other parts of one or more other segments, and one or more other parts of each segment may abut or otherwise meet with one or more other parts of one or more other segments, without securement therebetween. The skilled man will be aware of various arrangements and configurations that are possible to achieve the conjoining of two or more segments to form an enclosing pipeline annulus in a closed position, and the disconnection of such segments to allow their separation from each other. Where two parts of two segments are not secured together, such as by merely abutting, their disconnection may not involve any unsecurement or other release or unlocking in order to achieve their movement to an open position The segments maybe conjoined by the use of one or more linkers, linkages or conjoiners, such as pins, bolts, biasers, locks, etc, particularly such as locking pins. Preferably, the segments have complimentary conjoining configurations able to be brought together in the closed position to allow the direct and/or single-action addition and/or removal of one or more linkers, etc., such as quick-release locking pins, therebetween.

Any such conjoiners are removable to allow the segments to move from their closed position to their open position. To move the segments to their open position, the segments are disconnected or otherwise disengaged, followed by movement of at least one segment, typically of at least two segments, more typically of all segments, to locations wherein the segments are unconnected and separate from each other. That is, there are no connections between the segments, and each segment is independent from at least one other segment, preferably all other segments. Independent movement of each segment is possible, such movement being distinct from the movement of at least one other segment, preferably distinct from all other segments.

By being able to disconnect and separate at least two of the segments of the tensioning assembly of the present invention, an increased clearance between the segments is possible despite the limited or constrained space between the legs of the tower compared with conventional opening or moveable tensioners, such as those shown in EP2005050B, and WO2008/007945A. Thus, heavier and/or larger subsea structures and assemblies can be added to the pipeline or allowed along the lay path, whilst the pipeline is maintained in its launch trajectory.

According to one embodiment of the present invention, at least one segment comprises two or more sections moveable relative to each other.

According to another embodiment of the present invention, at least one segment comprises a central section and two wing sections. More preferably, each segment comprises a central section and two wing sections.

Each section of a segment of a tensioning assembly of the present invention comprising two or more sections may be moveable about one or more axes, optionally by the use of one or more actuators. In one example, two or more sections may be hinged through one or more axles to provide relative rotational movement thereinbetween.

Where a segment comprises a central section and two wing sections, preferably each wing section is hinged on or about the central section. Each moveable section may be moveable independently of each other section. Preferably, movement of moveable sections is conducted in a coordinated manner during movement of the segments between their open and closed positions.

According to another embodiment of the present invention, each segment includes one or more pipeline-supporting tracks.

According to another embodiment, at least one segment comprises an outer frame part and a centralizer part. Preferably, all segments of the tensioning assembly comprise an outer frame part and a centralizer part.

According to another embodiment, the segments of the tensioning assembly of the present invention form, in their closed position, a polygonal-outer shape: preferably the outer shape is an octagon.

According to another embodiment, the present invention provides a tensioning assembly comprising a first segment having a central section and two articulated wing sections, each wing section having a centralizer part comprising half of the pipeline annulus.

According to another embodiment of the present invention, the present invention provides a tensioning assembly comprising a first segment and a second segment, each segment having a central section and two wing sections, and each central section having a centralizer part comprising half of the pipeline annulus.

The segments of a tensioning assembly of the present invention may be separately supported by a support chassis being part of or attached to a leg of the tower, and the segments may be moveable relative to the support chassis. The tower is preferably able to support a number of tensioning assemblies along a particular pathway such as a launch trajectory.

The tower of the present invention may have more than two legs, as well as other or further support or supports. Optionally all the tensioning assemblies of the tower are as defined herein.

According to one embodiment of the present invention, the pipeline being laid or to be laid from or through the tower is a flexible pipeline.

According to a second aspect of the present invention, there is provided a tensioning assembly comprising two or more discrete segments as described herein for surrounding and supporting a marine pipeline during installation thereof through a tower as also defined herein.

A tensioning assembly of the present invention can preferably form a 3.5 m diameter clearance circle between the segments in their open position. Starting from a maximum closed clearance of 1.8 m, this is nearly a doubling of the clearance now possible between the fixed legs of a tower.

According to a third aspect of the present invention, there is provided a method of providing a clearance circle between two or more discrete segments of a marine pipeline-installation tower having one or more tensioning assemblies comprising two or more discrete segments as defined herein, comprising the steps of;

(a) disconnecting the segments in their closed pipeline-supporting position; and (b) moving the segments to their open position such that at least two of the segments are unconnected and separate.

According to a further aspect of the present invention there is provided a pipeline-installation vessel comprising a tower, one or more tensioning assemblies comprising two or more discrete segments, or both, as described herein.

BRIEF DESCRIPTION OF THE DRAWINGS

Embodiments of the present invention will now be described, by way of example only, and with reference to the accompanying drawings, in which:

FIGS. 7a and 7b are plan and elevation views respectively of a second tensioning assembly according to another embodiment of the present invention, in its closed position; and FIGS. 8a and 8b are plan and elevation views respectively of the second tensioning assembly of FIGS. 7a and 7b in its open position.

DESCRIPTION OF PREFERRED EMBODIMENTS

Figure 1:
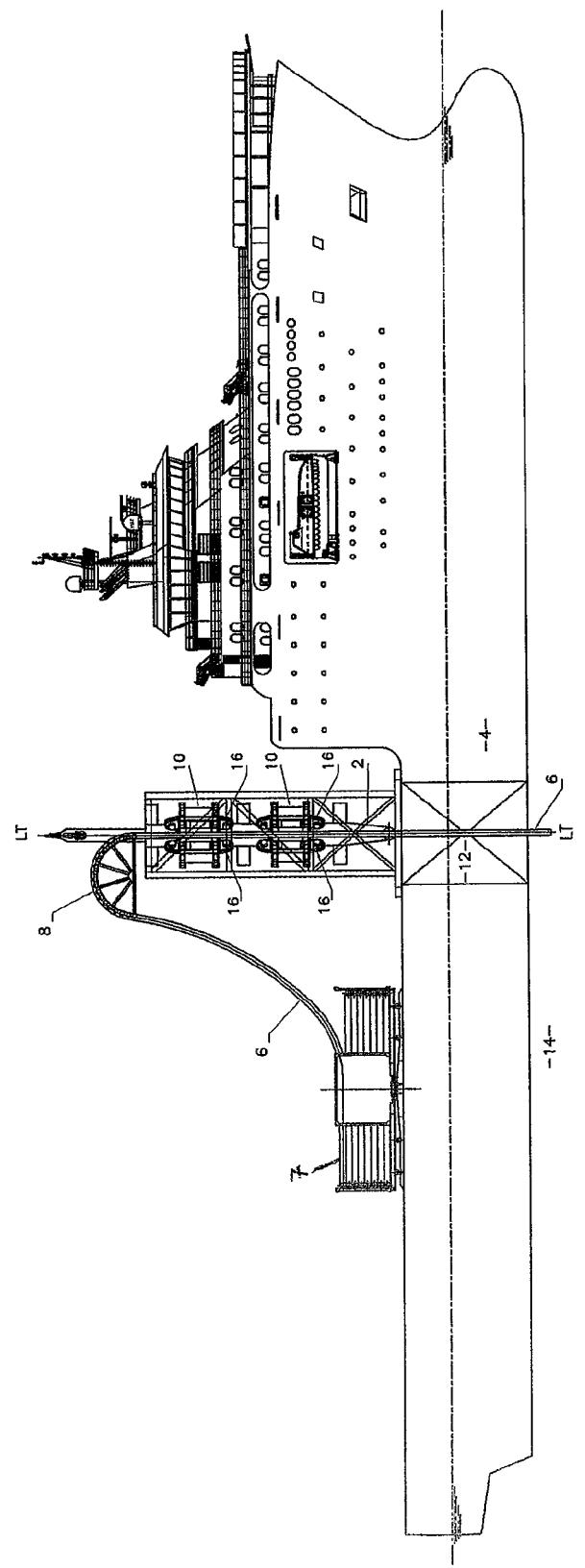
FIG. 1 is a diagrammatic side view of a vessel with a tower having a number of tensioning assemblies for a pipeline.

Referring to the drawings, FIG. 1 shows, a conventional tower 2 on a marine-pipeline installation vessel 4. The tower 2 and vessel 4 are part of a pipe-laying operation for a pipeline 6 such as a flexible pipe provided from a source such as a basket 7 on the vessel 4, over a ramp arch 8 at or near the top of the tower 2, and through one or more tensioning devices 10, before passing through a moonpool 12 and into the sea 14 for laying, generally on a sea floor (not shown).

As the pipeline 6 leaves the vessel 4, its weight is suspended in the sea 14 prior to reaching the sea floor. The suspension of the pipeline 6 exerts a considerable force on the vessel 4, so that it must be firmly held during the laying operation. The pipeline 6 is firmly held by the tensioning devices 10. The vessel 4 may also comprise one or more clamping devices (not shown) able to hold the pipeline 6, generally for the addition for one or more accessories to the pipeline 6 during its laying.

The tensioning devices 10 generally comprise one or more tensioners 16 squeezing the pipeline 6, generally through the use of two or more actuators (not shown), and commonly employing one or more tracks at the interface between the tensioning devices 10 and the pipeline 6, to allow movement of the pipeline 6 in a controlled and slow manner through the tensioning devices 10.

As discussed hereinbefore, during a flexible pipe laying operation, it is commonly necessary or desired to pass flexible pipe end fittings, included in the pipeline 6 prior to the tower, which must then travel along the lay path. Typically such end fittings have a cross-section which is larger than the cross section of the pipeline 6 itself, and therefore larger than the central space within each tensioning device 10, generally defined by the gap between the tensioners 16

Alternatively, accessories such as manifolds, supports need to be inserting into the pipeline during its pathway through the tower 2.

However, the need to move the tensioning devices is a significant exercise, whilst being limited to the conventional maximum clearance circle that is possible of 1.8 m.

Figure 2:
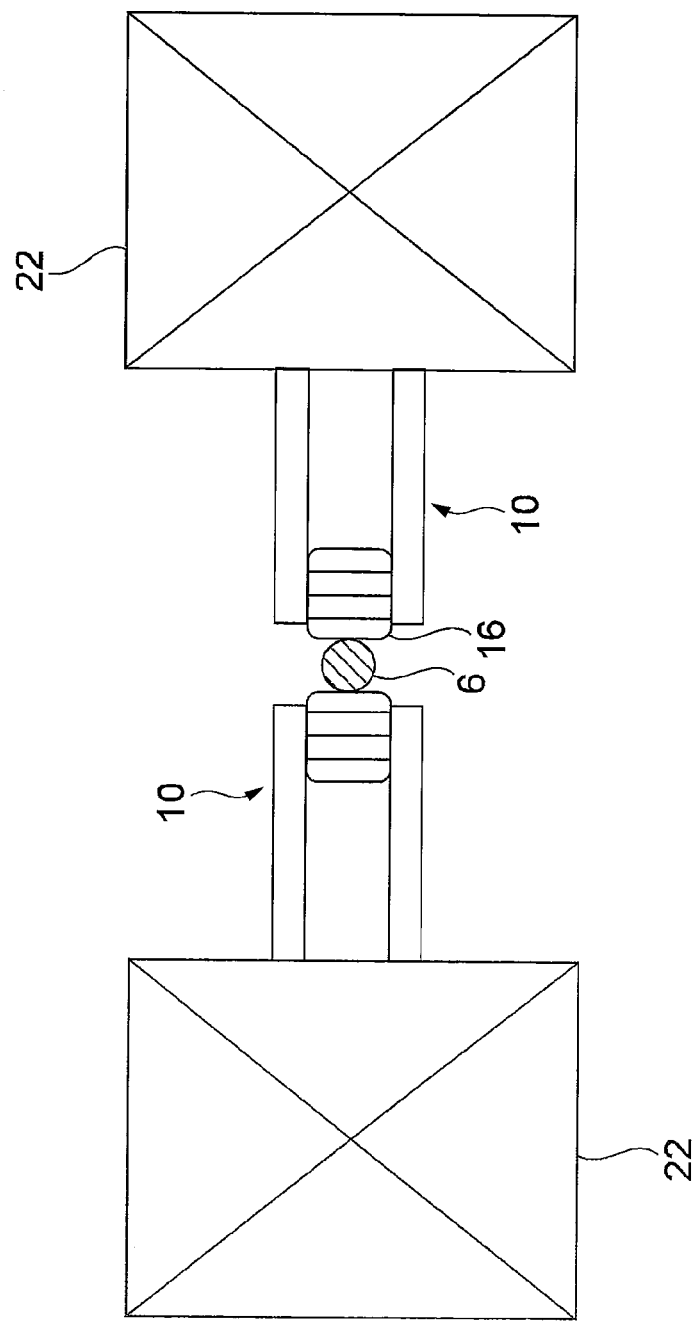
FIG. 2 is a diagrammatic plan view of the tower and a first tensioning device in FIG. 1.

FIG. 2 shows a simplistic plan view of the tower 2 of FIG. 1, based on two legs 22, showing the limited room thereinbetween.

Figure 3:
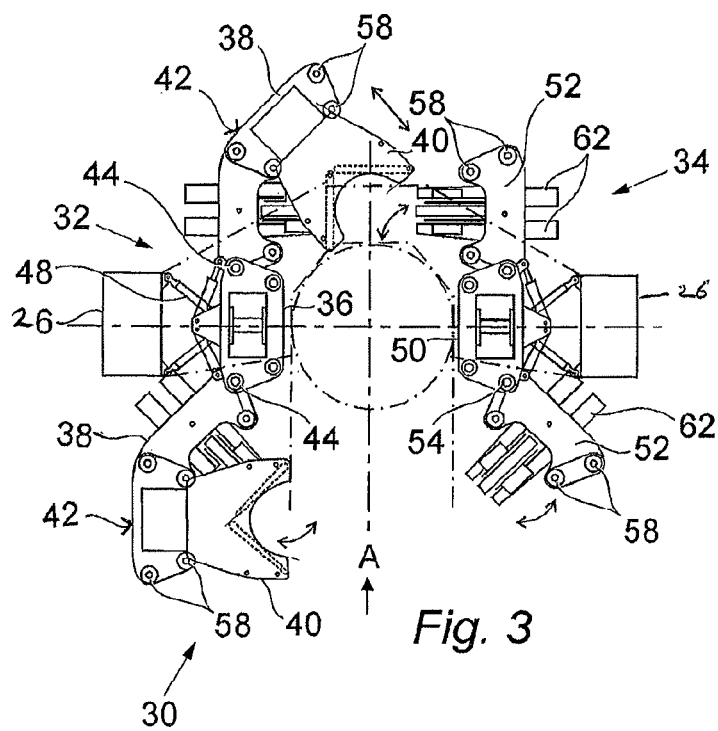
FIG. 3 is a plan view of a first tensioning assembly according to one embodiment of the present invention in an open position.

FIG. 3 shows a plan view first marine pipeline-installation tower and tensioning assembly 30 of the present invention, for surrounding and supporting an intermediate pipeline (not shown) during installation.

The tower comprises two legs 26 fixed to a vessel (not shown), and supporting the tensioning assembly 30, which comprises two discrete segments, being a first segment 32 which is larger than a second segment 34.

Figure 4:
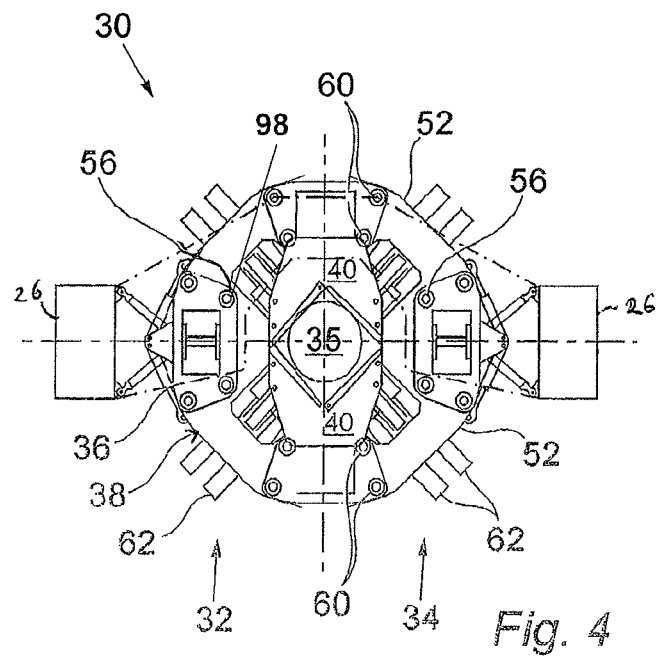
FIG. 4 is a plan view of the tensioning assembly of FIG. 3 in a closed position.

FIGS. 3 and 4 show the first and second segments 32, 34 being moveable between a closed position as shown in FIG. 4, wherein the segments 32, 34 are conjoined to form an enclosing pipeline annulus 35 able to support the pipeline (not shown), and an open position as shown in FIG. 3, wherein the first and second segments 32, 34 are disconnected and separate.

More particularly, FIGS. 3 and 4 show the first segment 32 comprising a central section 36 and two wing sections 38. The wing sections 38 are moveable relative to the central section 36. Each wing section 38 comprises an outer frame part 42 as well as a centralizer part 40 which subsequently forms half of the pipeline annulus 35. Each outer part 42 may comprise two or more parts, optionally articulated.

FIG. 3 shows each wing section 38 connected to the central section 36 via an axle 44, such that the wing sections 38 are moveable between their open position as shown in FIG. 3, and their closed position as shown in FIG. 4. The central section 36 is supported by the tower leg 26, optionally via a support chassis, such as involving one or more struts, which stabilize the tensioners, and one or more actuators 48 able to operate and control the movement of the wing sections 38.

The second segment 34 of the tensioning assembly 30 shown in FIGS. 3 and 4 also comprises a central section 50 and two wing sections 52. The wing sections 52 are moveable relative to the central section 50 via two axles 54, such that the wing sections 52 are moveable between an open position as seen in FIG. 3, and a closed position as shown in FIG. 4.

The second segment 34 is also supported by the other tower leg 26, optionally via a support chassis.

Each of the segments 32, 34 are included in and limited by the fixed space defined between the two legs 26 of the tower 2.

FIG. 3 shows the open position of the tensioning assembly 30, able to provide a clearance circle of 3.5 m or 3500 mm between all parts of the first and second segments 32, 34. In this way, any appendage or accessory to the pipeline having a diameter of up to 3.5 m, can still be passed along the launch trajectory (LT of FIG. 1) of the pipeline through the tensioning assembly 30 when required.

Any such appendage or accessory may have a regular circumference, or an irregular circumference. FIG. 3 shows that the open position of a tensioning assembly 30 can allow for the passage of an appendage or accessory either having a regular diameter of 3.5 m, or having an irregular diameter being at least part greater than 3.5 m, which is 'accommodateable' in the further space between the lower most wing sections 38, 52 of the first and second segments 32, 34.

FIG. 4 shows the movement of the first and second segments 32, 34 to their closed position such that the centralizer parts 40 on each wing section 42 of the first segment 32 are brought together and meet to form the enclosing pipeline annulus 35, such annulus having the relevant diameter of the pipeline being installed.

In the closed position, there is co-axial alignment of a number of corresponding apertures 56 in the central sections 36, 50 of the first and second segments 32, 34 and the wing sections 38, 52, through which one or more locking pins 98 can pass in order to secure the first and second segments 32, 34 in their closed positions.

Also, distal apertures 58 at the end of each wing section 38, 52 can be brought into a co-axial alignment, such that one or more conjoiners such as locking pins 60 can be passed through the apertures 58 in order to conjoin the first and second segments 32, 34 together when the first and second segments 32, 34 are in their closed position as shown in FIG. 4. In this way, the first and second segments 32, 34 are conjoined, and preferably secured together with secure but releasable locking pins 60.

As mentioned above, the conjoining of the segments may include the connection, linking or other joining, of one or more parts of each segment with one or more parts of each other segment. Optionally, one or more parts of each segment may be secured to one or more other parts of one or more other segments, and one or more other parts of each segment may abut or otherwise meet with one or more other parts of one or more other segments, without securement thereinbetween. The skilled man will be aware of various arrangements possible to achieve the conjoining of two or more segments to form an enclosing pipeline annulus in a closed position, and the disconnection of such segments to allow their separation from each other.

Also shown in FIGS. 3 and 4, a number of actuators 62 are located through each wing section 38, 52 in order to provide force against the pipeline-supporting frame parts 40 when required to provide tension of the tensioning device 30 against the pipeline.

Figures 5, 6:
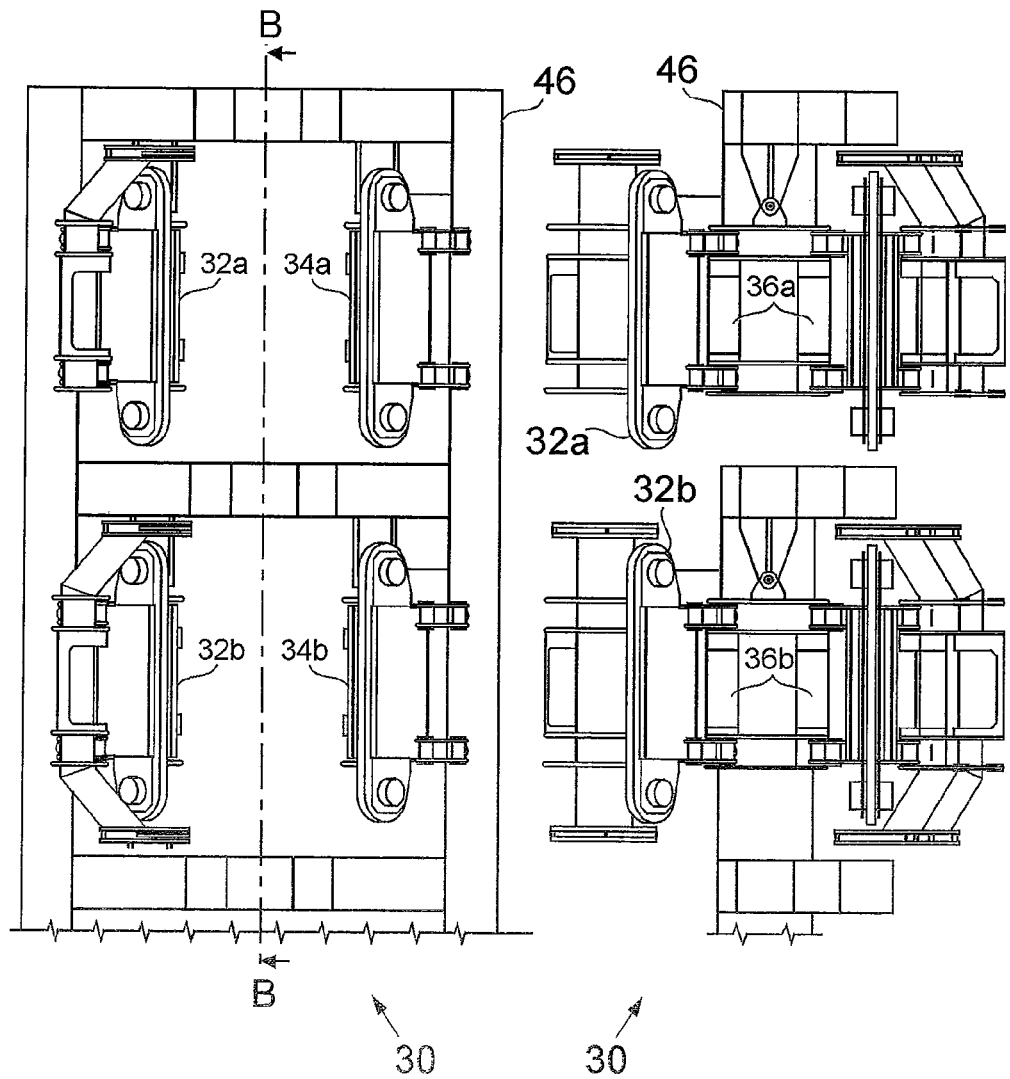
FIG. 5 is a side view from arrow A of FIG. 3.
FIG. 6 is a section view along line BB of FIG. 5.

FIG. 5 shows a simplified elevation view of tensioning assembly 30 of FIG. 3 from arrow A, comprising an upper pair of first and second segments 32*a*, 34*a*, and a lower pair of first and second segments 32*b*, 34*b*. All of these segments 32*a*, *b*, 34*a*, *b* are attached to a common support chassis 46.

FIG. 6 shows a section view of tensioning assembly 30 of FIG. 5 along line BB, comprising the upper first segment 32*a*, and the lower first segments 32*b*, as well as upper and lower central sections 36*a*, 36*b*.

The tensioning assembly 30 is shown in FIGS. 5 and 6 in its open position, creating a clearance circle of up to 3.5 m between the first and second segments 32*a*, *b*, 34*a*, *b* along the (vertical) launch trajectory through the legs 26 of the tower. As can be seen, an extensive space has been created by the relative movement of the wing sections of each segment 32*a*, *b*, 34*a*, *b*, generally 'outwardly' relative to the central sections 36*a*, *b* of the first segments 32*a*, *b*.

FIGS. 7*a*, 7*b*, 8*a* and 8*b* show plan and elevation views of a second tensioning assembly 70 according to another embodiment of the present invention, in its closed and open positions respectively.

FIG. 7*a* shows the third tensioning assembly 70 comprising a first segment 72 having a central section 74 and two wing sections 76. The central section 74 has a centralizer part 78 including two half centralizers 80, each half part moveable between an open position as shown in FIG. 8*a*, and a closed position as shown in FIG. 7*a*. Each wing section 76 is formed of two parts. Together, the central section 74 and the wing sections 76 form an outer frame part have five sides outwardly.

The central section 74 is supported on the fixed legs 84 of a tower, optionally via a support chassis. The central section 74 is moveable relative to the legs 84, generally in a single lateral direction towards a second segment 86 as now described.

The second tensioning assembly 70 also comprises a second segment 86 having a central section 88 and two wing sections 90. The central section 88 comprises a centralizer part 92 having two half parts 94, generally being the same or similar as the two half parts 80 of the centralizer parts 78 of the first segment 72.

In the closed position of the third tensioning assembly 70 shown in FIG. 7*a*, the half parts 80, 94 of the centralizer parts 78, 92 of the first and second segments 72, 86 are closed against the other halves. This is achieved by moving the first and second segments 72, 86 towards each other and away from the legs 84, such that the centralizer parts 78, 92 form an enclosing pipeline annulus 96 to support a pipeline (not shown). Upon reversal of these movements, the tensioning assembly 70 moves to its open position as shown in FIG. 8*a*, wherein the first and second segments 72, 86 are disconnected and separate.

Similar to the conjoining of the first and second segments 32, 34 of the first tensioning assembly 30 shown in FIGS. 3 and 4, complimentary apertures 56 in the wing sections 76, 90 of the first and second segments 72, 86 of the second tensioning assembly 70 can be aligned when the first and second segments 72, 86 are in their closed position, and locking pins 98 can be inserted therethrough in order to securely conjoin the first and second section 72, 86 as described above.

As shown in FIG. 8*a*, once the first and second segments 72, 86 of the second tensioning assembly 70 are in their open position, there is a clearance of 3.5 m between the halves of the two inner pipeline-installation halves 78, 92, to allow the passage of one or more appendages or accessories in or to the pipeline through the second tensioning assembly 70 between the fixed and limited space between the legs 84.

The skilled man will be aware that a tensioning assembly of the present invention may comprise more than two segments, such as 3, 4, 5, 6 or more segments, able to be conjoined, generally in a circular fashion, to surround and support a pipeline able to pass therethrough. There is no limitation as to the relative sizes of such complimentary segments, nor to their method of conjoining either prior to or as part of the conjunction of the segments to form the enclosing pipeline annulus.

The present invention provides a tensioning assembly able to increase the clearance circle therein compared to conventional tensioning devices.

Various modifications and variations to the described embodiments of the inventions will be apparent to those skilled in the art without departing from the scope of the invention as defined in the appended claims. Although the invention has been described in connection with specific preferred embodiments, it should be understood that the invention as claimed should not be unduly limited to such specific embodiments.

What is claimed is:

1. A tensioning assembly comprising a plurality of discrete segments configured to surround and support a marine pipeline, and configured to permit the marine pipeline to pass therethrough during installation of the marine pipeline through a marine pipeline-installation tower that comprises at least two opposing legs that support the tensioning assembly,
the plurality discrete segments including a first segment and a second segment,
wherein the first and the second segments are moveable between a closed position where the first and the second segments are conjoined to form an enclosing pipeline annulus able to support the marine pipeline between the at least two opposing legs of the marine pipeline-installation tower; and
an open position where the first and the second segments are disconnected and separate,
wherein at least one of the first segment and the second segment comprises two or more sections moveable relative to each other.

2. The tensioning assembly as claimed in claim 1, wherein at least one of the first segment and the second segment comprises a central section and two wing sections.

3. The tensioning assembly as claimed in claim 2, wherein each of the first segment and the second segment comprises a central section and two wing sections.

4. The tensioning assembly as claimed in claim 2, wherein the two wing sections are moveable relative to the central section.

5. The tensioning assembly as claimed in claim 1, wherein the first segment has a central section and two articulated wing sections, each wing section having a centralizer part comprising half of the pipeline annulus.

6. The tensioning assembly as claimed in claim 1, wherein each of the first segment and the second segment has a central section and two wing sections, and each central section having a centralizer part comprising half of the pipeline annulus.

7. The tensioning assembly as claimed in claim 1, wherein each of the first segment and the second segment includes one or more pipeline-supporting tracks.

8. The tensioning assembly as claimed in claim 1, wherein the first segment is larger than the second segment.

9. The tensioning assembly as claimed in claim 1, wherein at least one of the first segment and the second segment comprises an outer frame part and a centralizer part.

10. The tensioning assembly as claimed in claim 1, wherein the first segment and the second segment in the closed position form a polygonal outer shape.

11. The tensioning assembly as claimed in claim 10, wherein the outer shape is an octagon.

12. The tensioning assembly as claimed in claim 1, wherein the first segment and the second segment are separately supported by a support chassis on the marine pipeline-installation tower, and the first segment and the second segment are moveable relative to the support chassis.

13. The tensioning assembly as claimed in claim 1, wherein the first segment and the second segment are configured to form a 3.5 m diameter clearance circle in the open position.

14. The tensioning assembly as claimed in claim 1, wherein the pipeline is a flexible pipeline.

15. The tensioning assembly as claimed in claim 1, wherein each section is rotatably mounted to rotate from the closed position to the open position and from the open position to the closed position.

16. A pipeline-installation vessel comprising a tower comprising at least two opposing legs, one or more tensioning assemblies as defined in claim 1.

17. A marine pipeline-installation tower comprising at least two opposing legs, and one or more tensioning assemblies as defined in claim 1.

* * * * *